Inventor
Leldon W. Phillips,

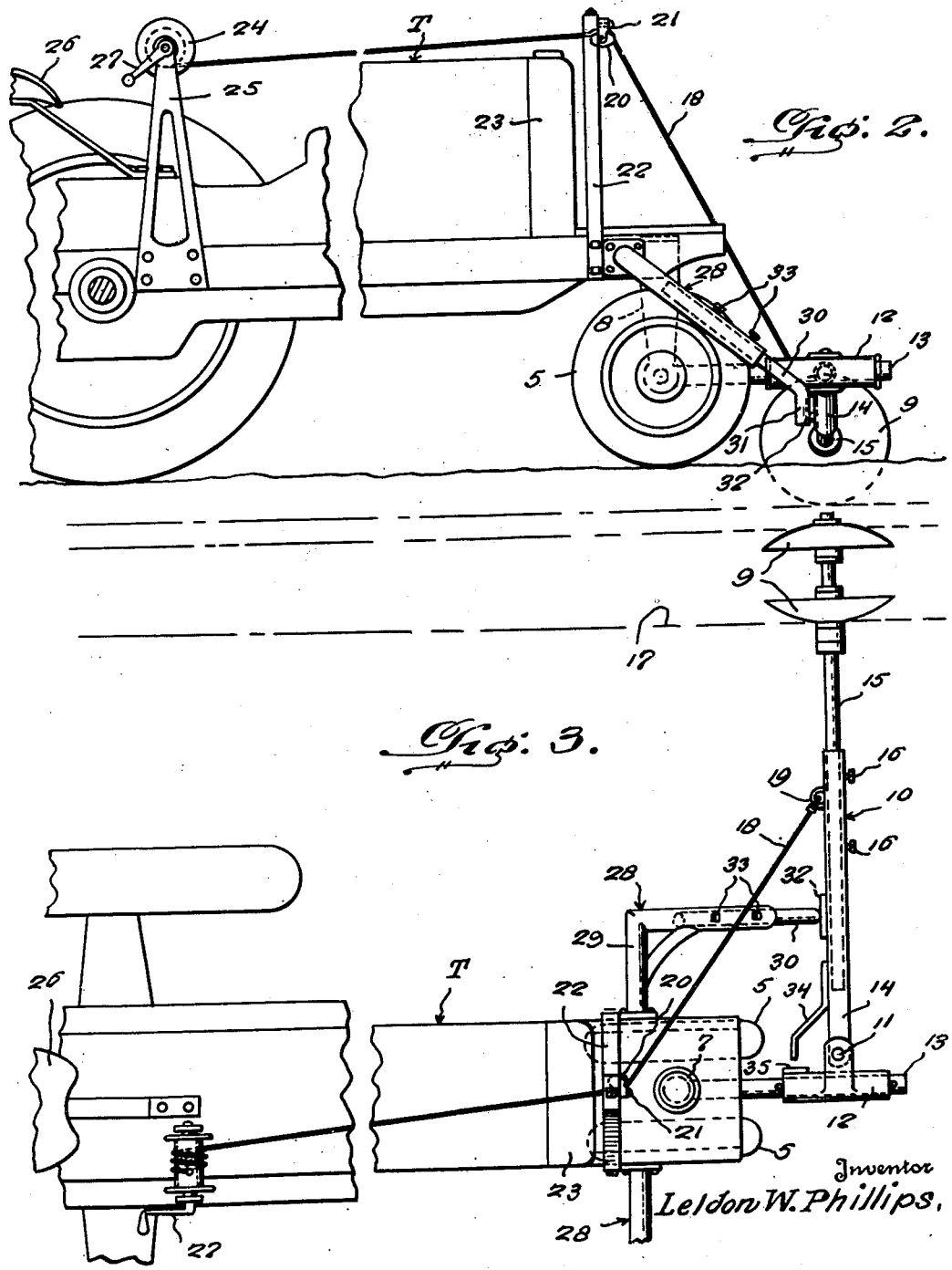

Patented Mar. 29, 1949

2,465,660

UNITED STATES PATENT OFFICE 2,465,660

AUTOMATIC STEERING ATTACHMENT FOR TRACTORS

Leldon W. Phillips, Sudan, Tex.

Application July 25, 1947, Serial No. 763,669

3 Claims. (Cl. 97—49)

1

This invention relates to that type of tractor guide embodying a furrow following device disposed in laterally offset relation to the tractor. Because of the lateral positioning of the furrow following device, the ground resistance against the furrow following device tends to swing it rearwardly and steer the tractor in the corresponding direction, even though the furrow being followed is straight. It has been proposed to provide means to counteract this tendency of the ground resistance against the furrow following device to swing it rearwardly, while still utilizing swinging movement of the device to steer the tractor. Such means, however, have not been found efficient or entirely satisfactory.

In accordance with the present invention, the objections to prior tractor guides of the type set forth have been entirely overcome, by hinging the disk-carrying beam to the horizontal steering arm which is fixed to and projects forwardly from the front axle of the tractor, and by providing positive means which prevents rearward swinging of said beam but allows longitudinal movement thereof so that steering of the tractor is effected by pushing and pulling actions of the steering arm in a direction transversely of the tractor.

A specific object of the invention is to provide a tractor guide of the above kind in which the laterally disposed furrow following device is capable of being positioned to either side of the tractor, and in which means is provided to positively prevent rearward swinging of said device in either operating position thereof.

Other and more specific objects and features of the invention will become apparent from the following description when considered with the accompanying drawings, in which:

Figure 2 is a fragmentary side view thereof, with a rear wheel of the tractor removed.

Figure 3 is a fragmentary top plan view of the same.

Figure 1:
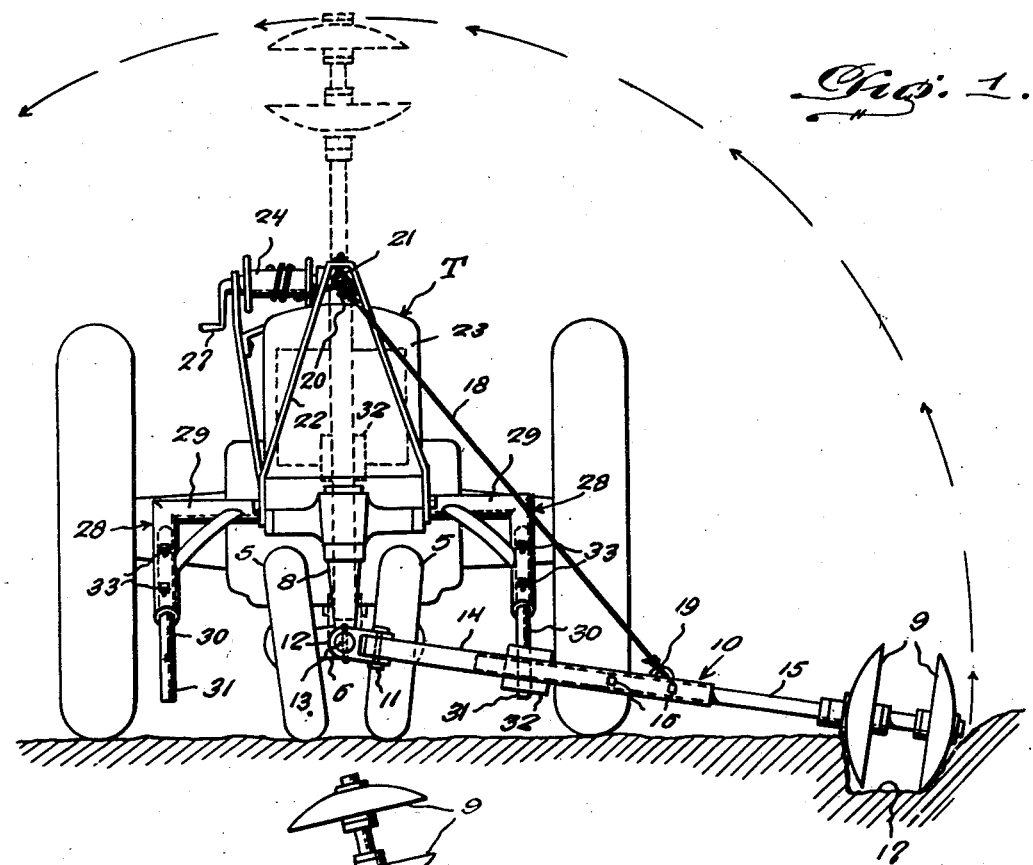
Figure 1 is a front elevational view of a tractor equipped with a guide embodying the present invention.
Figure 4:
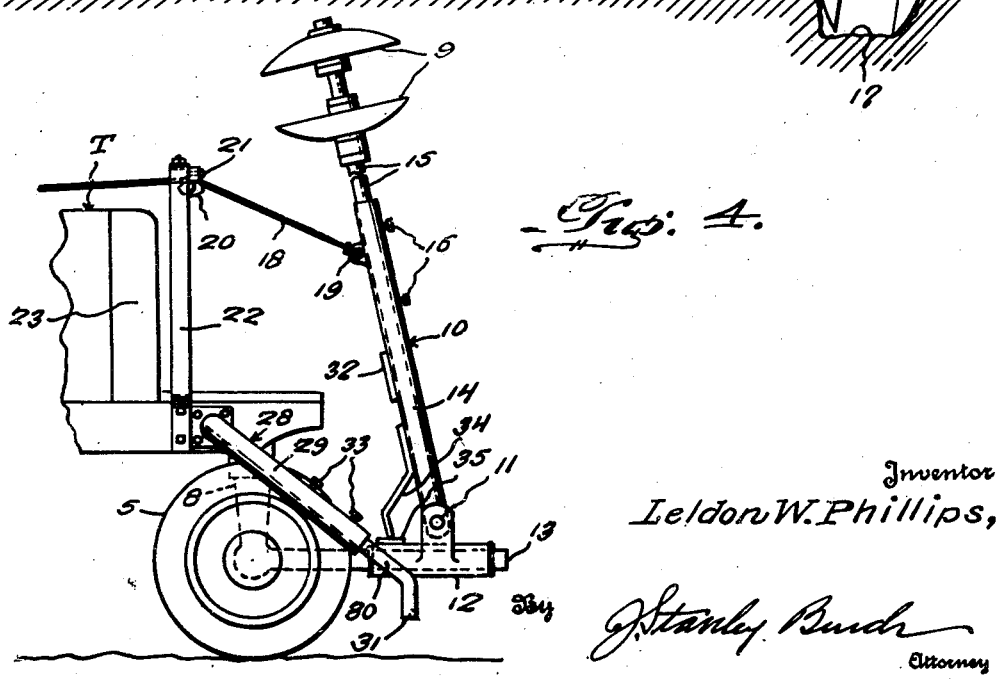
Figure 4 is a view somewhat similar to Figure 2, with the furrow following device raised to an upright inoperative position.

Referring in detail to the drawings, the tractor T has the usual narrow front supporting truck including wheels 5 journaled on the ends of an axle 6 which is provided with a central vertical spindle 7 journaled in a sleeve 8 depending from the front end of the tractor body. Steering connections, not shown, are made with the spindle 7 for turning the truck to steer the tractor.

The present guide includes a furrow following device comprising a pair of spaced disks 9 journaled on the outer end of an extensible beam 10 having its inner end hinged at 11 to a horizontal steering arm 13 rigid with and projecting forwardly from the axle 6 between the wheels 5. Beam 10 comprises a tubular inner section 14 in which is telescoped an outer section 15 held in adjusted positions by set screws 16. The position of the disks 9 laterally of the tractor may be adjusted by adjusting beam section 15 relative to beam section 14. Hinge axis 11 is disposed at a right angle to steering arm 13 and transversely of beam 10. Disks 9 are arranged to bear against the sides of a furrow 17.

To raise the furrow following device to a vertical inoperative position, or to swing it from either side of the tractor to the other, I provide lifting means including a flexible member or cable 18 attached at one end to the outer portion of beam section 14 as at 19. The flexible member 18 passes rearwardly and upwardly from the beam 10 over a pulley 20 having a mount hinged at 21 for lateral swinging movement to the under side of the central portion of an inverted substantially V-shaped bracket 22 fixed to and projecting upwardly from the tractor body in front of the radiator housing 23 of the tractor. From pulley 20, the flexible member 18 extends rearwardly to a winding drum 24 journaled at the top of a supporting bracket 25 fixed to a side of the tractor body in front of the driver's seat 26, said drum having an operating crank 27 operable from said seat. In order to prevent rearward swinging of the furrow following device when in lowered operative position at either side of the tractor, an angular beam abutment bracket 28 is rigidly attached to each side of the forward end of the tractor body. Each bracket 28 includes an angular tubular inner section 29 fixed at one end to the tractor body and arranged so that its other end portion extends forwardly and downwardly, and an outer section 30 slidably telescoped in said other end portion of section 29 and having a downturned forward end portion 31 arranged to bear against the rear face of a wear plate 32 fixed to the rear side of beam section 14 when the furrow following device is operatively disposed at the adjacent side of the tractor at a right angle to the line of travel. Set screws 33 secure the section 30 in adjusted position so as to contact plate 32 when the beam 10 is disposed as stated.

In order to allow sufficient steering of the tractor to the side opposite that at which the furrow following device is located, and to also prevent rearward swinging of said device against the tractor body or radiator when said device is vertically disposed in an inoperative position, an inwardly and rearwardly directed angular stop arm 34 is fixed to the rear side of the inner portion of beam 10 and arranged to contact a wear plate 35 fixed to sleeve 12.

In use, the disks 9 follow the furrow, and when a curve in the furrow, away from the tractor is encountered, the beam 10 is pulled outwardly so as to correspondingly pull the steering arm 13 and steer the tractor in the proper direction. When a curve in the furrow toward the tractor is encountered, the beam 10 is pushed inwardly so as to correspondingly push the steering arm 13 and properly steer the tractor, the normal spacing of arm 34 from plate 35 permitting the latter. Rearward swinging of beam 10 is not permitted or relied upon to steer the tractor, steering being effected solely by longitudinal movement of beam 10 transversely of the tractor, and relative to the adjacent beam abutment bracket 28.

Modifications and changes in details of construction are contemplated within the scope of the invention as claimed.

What I claim is:

1. In combination with a tractor including a longitudinal body supported at its front end on a two wheeled truck turnable about a vertical axis, a guide for the tractor comprising a forwardly extending steering arm fixed to said truck between its wheels, a sleeve journaled on the forward end of said steering arm, a furrow following device including a laterally extending beam hinged at its inner end to said sleeve on an axis disposed at a right angle to the steering arm and transversely of the beam and a pair of spaced disks journaled on the outer end of said beam, means operable from the driver's seat of the tractor to swing said furrow following device to a vertical inoperative position or to a lowered operative position at either side of the tractor, and a beam abutment bracket fixed to and extending forwardly and downwardly from each side of the forward end of the tractor body to bear against and prevent rearward swinging of said furrow following device when operatively disposed at either side of the tractor.

2. The construction defined in claim 1, in combination with a rearwardly and inwardly extending stop arm fixed to the rear side of the inner end portion of said beam and arranged to contact the sleeve when the furrow following device is raised to the vertical inoperative position so as to limit rearward swinging movement of said device when so raised and prevent contact thereof with the front of the tractor, said arm being spaced from the sleeve when said device is in its lowered operative position and engaged by the adjacent beam abutment bracket.

3. The construction defined in claim 1, wherein each beam abutment bracket has a downturned forward end, and a wear plate fixed to the beam for contact by said downturned end.

LELDON W. PHILLIPS.

No references cited